US012579962B2

(12) United States Patent
Nakajima et al.

(10) Patent No.: US 12,579,962 B2
(45) Date of Patent: Mar. 17, 2026

(54) DEVICE AND ELECTRONIC MUSICAL INSTRUMENT

(71) Applicant: CASIO COMPUTER CO., LTD., Tokyo (JP)

(72) Inventors: Mari Nakajima, Hino (JP); Ryohei Kobayashi, Akishima (JP); Yuuki Nakajima, Tachikawa (JP); Kouji Oshima, Fussa (JP); Naoto Imamura, Akishima (JP); Shingo Fukushima, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1108 days.

(21) Appl. No.: 17/569,673

(22) Filed: Jan. 6, 2022

(65) Prior Publication Data

US 2022/0270577 A1 Aug. 25, 2022

(30) Foreign Application Priority Data

Feb. 25, 2021 (JP) ................................ 2021-028134

(51) Int. Cl.
*G10H 1/32* (2006.01)
*H04R 1/02* (2006.01)
*H04R 1/28* (2006.01)

(52) U.S. Cl.
CPC ................ *G10H 1/32* (2013.01); *H04R 1/02* (2013.01); *H04R 1/2803* (2013.01)

(58) Field of Classification Search
CPC .......... G10H 1/32; H04R 1/02; H04R 1/2803
USPC ........................................................ 84/600
See application file for complete search history.

(56) References Cited

U.S. PATENT DOCUMENTS

| | | | | |
|---|---|---|---|---|
| 2017/0206878 A1* | 7/2017 | Hoshino | .................. | H04R 1/24 |
| 2019/0198000 A1* | 6/2019 | Oshiro | .................. | G10H 1/344 |
| 2020/0074968 A1* | 3/2020 | Suzuki | .................. | G10H 1/346 |

FOREIGN PATENT DOCUMENTS

| | | |
|---|---|---|
| JP | H04019698 A | 1/1992 |
| JP | 2012039553 A | 2/2012 |
| JP | 2019117290 A | 7/2019 |
| JP | 2019121865 A | 7/2019 |

* cited by examiner

*Primary Examiner* — Jeffrey Donels
*Assistant Examiner* — Philip G Scoles
(74) *Attorney, Agent, or Firm* — Holtz, Holtz & Volek PC

(57) ABSTRACT

A device includes: a frame-shaped support member that is configured to support an internal member; a fixing member that is inside a frame of the support member and is configured to fix the internal member; and a reinforcement member that is connected to the fixing member and with which the fixing member is reinforced. The reinforcement member is not connected to the support member.

15 Claims, 14 Drawing Sheets

DEVICE AND ELECTRONIC MUSICAL INSTRUMENT

CROSS-REFERENCE TO RELATED APPLICATIONS

This application is based on and claims priority under 35 USC 119 from Japanese Patent Application No. 2021-028134, filed on Feb. 25, 2021, the contents of which are incorporated herein by reference.

TECHNICAL FIELD

The present disclosure relates to a device and an electronic musical instrument.

BACKGROUND ART

In the related art, suggested is a keyboard instrument in which members such as a speaker and a circuit board is accommodated. For example, an electronic keyboard instrument disclosed in JP2019-117290A has a second housing to which a speaker is fixed. The second housing is fastened to a first housing below the second housing via a screw hole provided in a boss-shaped fixing portion of the first housing. An outer peripheral portion of the fixing portion is provided with ribs to improve strength of the fixing portion without weighting the fixing portion.

However, for example, when the electronic keyboard instrument drops and an impact is applied to an outer wall of the first housing, the impact is transmitted to the fixing portion via the ribs, thereby damaging the fixing portion. Therefore, there is a demand for a configuration that can secure strength of the fixing portion and is resistant to an external load.

SUMMARY

A device according to the present disclosure includes:

- a frame-shaped support member that is configured to support an internal member;
- a fixing member that is inside a frame of the support member and is configured to fix the internal member; and
- a reinforcement member that is connected to the fixing member and with which the fixing member is reinforced, in which
- the reinforcement member is not connected to the support member.

An electronic musical instrument according to the present disclosure includes:

- an internal member including a speaker;
- a frame-shaped support member that is configured to support the internal member;
- a fixing member that is inside a frame of the support member and is configured to fix the internal member; and
- a reinforcement member that is connected to the fixing member and with which the fixing member is reinforced, in which
- the reinforcement member is not connected to the support member.

BRIEF DESCRIPTION OF DRAWINGS

Exemplary embodiments of the present disclosure will be described in detail based on the following figures, wherein.

DETAILED DESCRIPTION

Figure 1A:
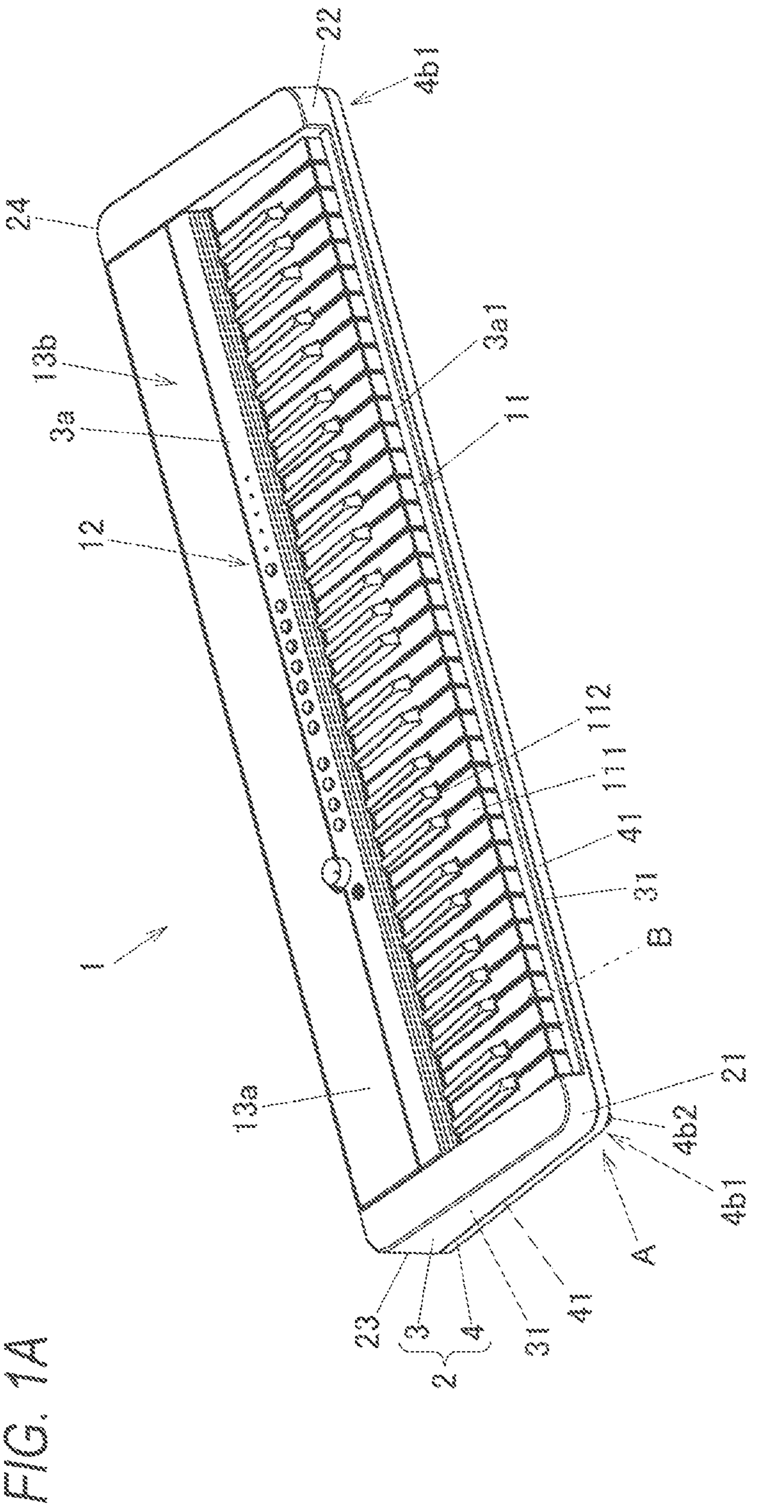
FIG. 1A is a perspective view of a keyboard instrument according to an embodiment of the present disclosure as seen from the front.

In the following, embodiments of the present disclosure will be described with reference to the drawings. A keyboard instrument 1 shown in FIG. 1A is an electronic instrument having a 61-key keyboard 11 and a case 2. In the following description of the keyboard instrument 1, a side on which the keyboard 11 is provided is referred to as "front," and the opposite side thereto is referred to as "rear." Seen from a player facing the keyboard 11, left side is referred to as "left," and a right side is referred to as "right." A side with a keystroke surface of the keyboard 11 of FIG. 1A is referred to as "upper," and the opposite side thereto is referred to as "lower."

The case 2 includes an upper case 3 and a lower case 4 which are made of resin and has a long rectangular plate shape whose longer direction is along a right-left direction.

In the case 2, an internal member 5 (refer to FIG. 3) that is a speaker unit, a circuit board, a battery that is a power source, and the like are accommodated. The keyboard instrument 1 has a control panel 12 for performing a variety of settings and the like on a rear upper surface of the case 2. A speaker part 13*a* is provided on a left side of the control panel 12, and a speaker part 13*b* is provided on a right side of the control panel 12. In the speaker parts 13*a* and 13*b*, an upper surface of the upper case 3 is provided with holes 13*al* (refer to FIG. 13), and upper side of the holes 13*a*1 are covered by fabric. Speakers 511 (refer to FIG. 13) are disposed in parts of the upper case 3 corresponding to the holes 13*al* of the speaker parts 13*a* and 13*b*. The keyboard 11 has white keys 111 and black keys 112, which are the keys, and the white keys 111 and black keys 112 are arranged in an opening 3*a*1 that is provided on a front side of the upper case 3 and whose longer direction is along the right-left direction.

Figure 1B:
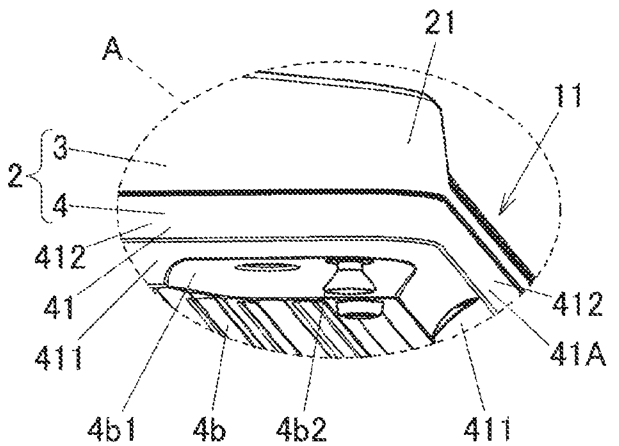
FIG. 1B is an enlarged view around an arrow A shown in FIG. 1A.
Figure 2:
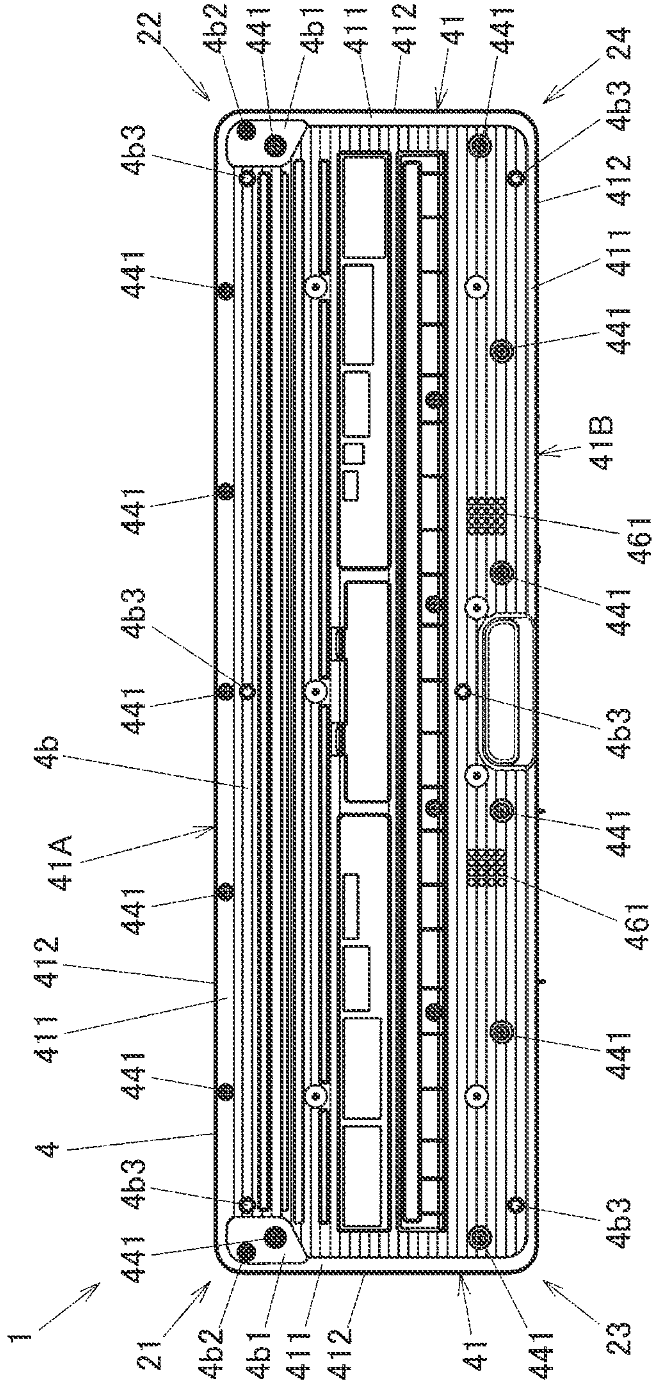
FIG. 2 is a bottom view of the keyboard instrument according to the embodiment of the present disclosure.

As shown in FIG. 2, the lower case 4 is provided with concave portions 4*b*1 concave from a bottom plate 4*b* of the lower case 4 at corner portions 21 on a left front side and a right front side of the case 2 (also refer to FIG. 1B). The concave portions 4*b*1 are formed such that an outer peripheral surface of the case 2 (lower case 4) is clipped in part around the concave portions 4*b*1. On a bottom portion of the concave portions 4*b*1, strap pins 4*b*2 to which a strap (not shown) can be attached is provided. Note that, as shown in FIG. 2, the concave portion 4*b*1 and the strap pin 4*b*2 on the corner portion 22 are symmetrical to the concave portion 4*b*1 and the strap pin 4*b*2 on the corner portion 21.

Figure 7:
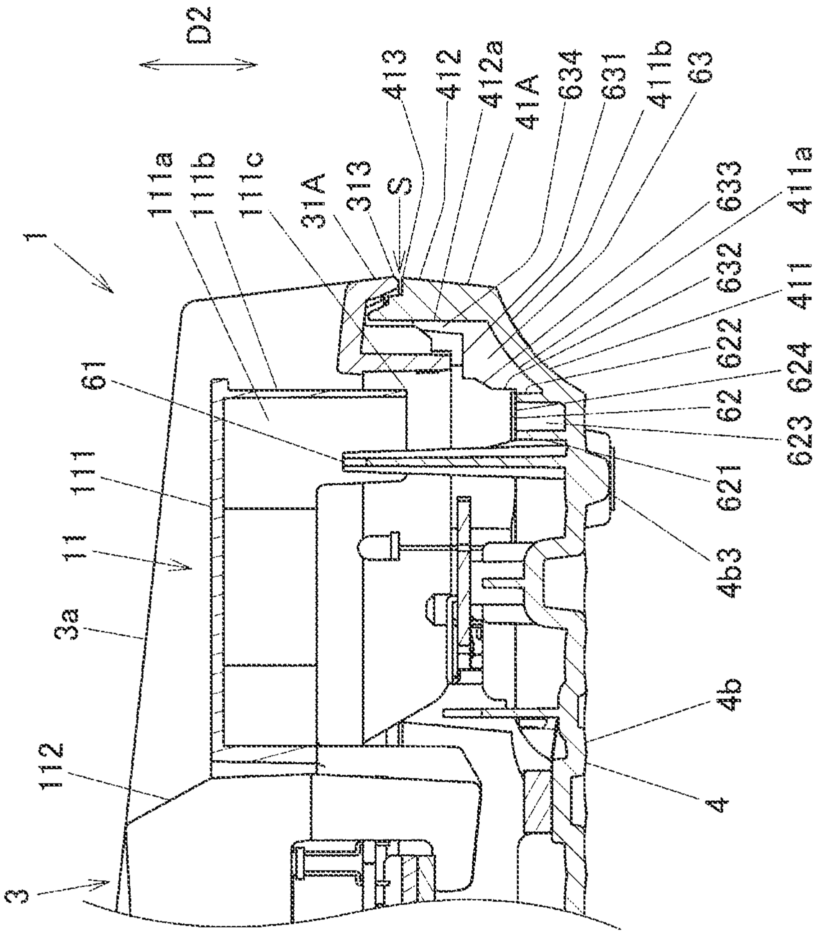
FIG. 7 is an enlarged cross-sectional view of a front side of the keyboard instrument of FIG. 1A according to the embodiment of the present disclosure as cut along a VII-VII cross section shown in FIG. 5A.
Figure 12:
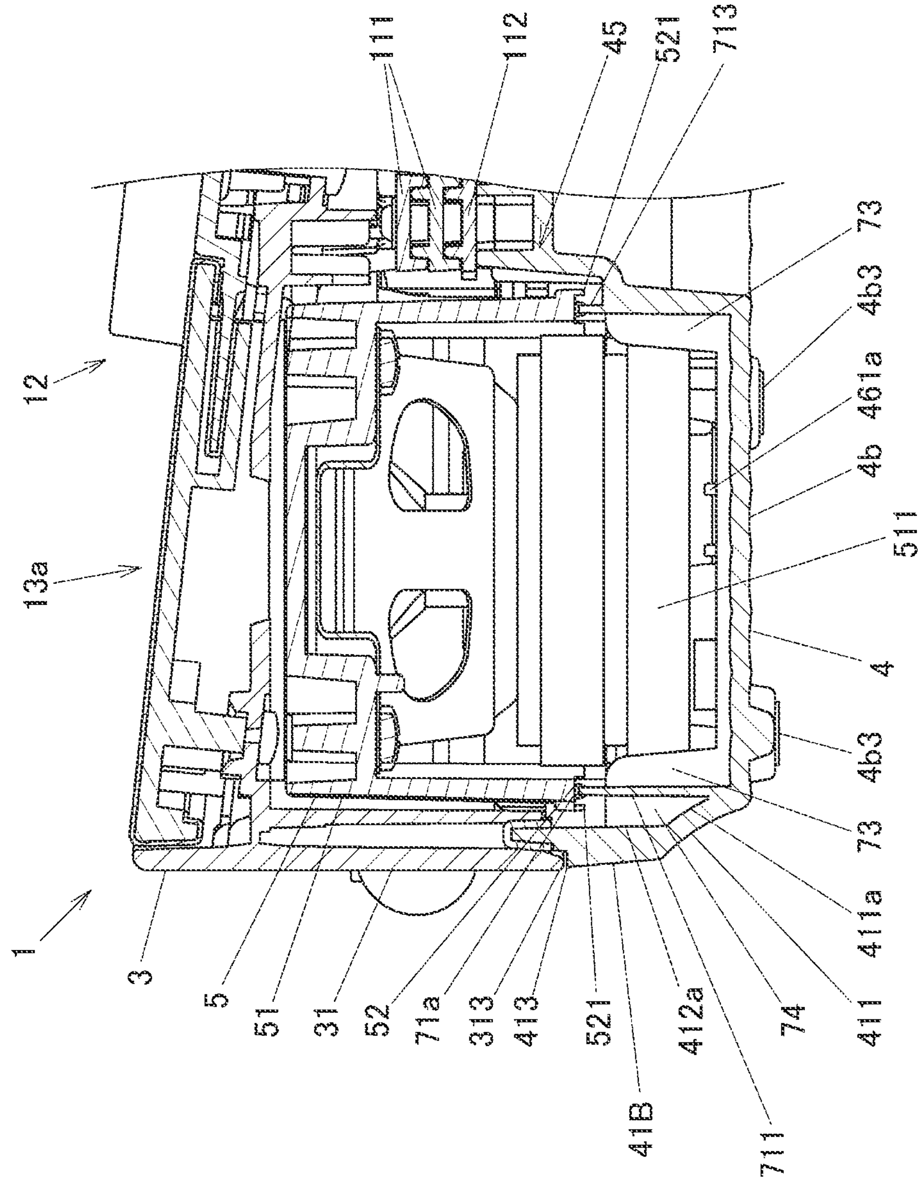
FIG. 12 is an enlarged cross-sectional view of a rear side of the keyboard instrument of FIG. 1A according to the embodiment of the present disclosure as cut along the VII-VII cross section shown in FIG. 5A.
Figure 13:
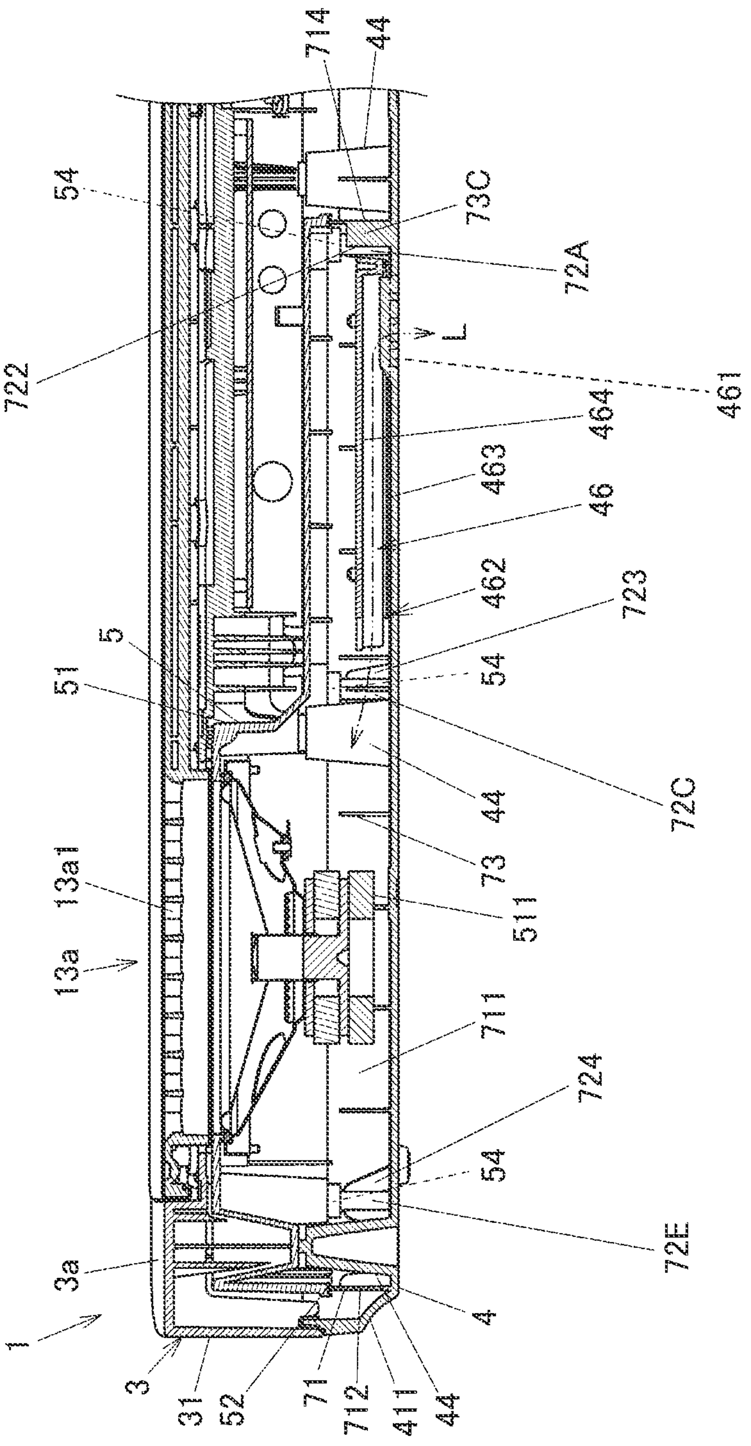
FIG. 13 is an enlarged cross-sectional view around the internal-member arranging part of the keyboard instrument of FIG. 1A according to the embodiment of the present disclosure as cut along a XIII-XIII cross section shown in FIG. 5A.

An outer wall 41 located on each of front, rear, right, and left side surfaces of the lower case 4 has a concave curved portion 411 at a corner portion of an outer surface on the bottom plate 4*b* (refer to FIGS. 7, 12, and 13). An outer surface of the concave curved portion 411 shown in FIG. 7 has a concave arc shape with a predetermined curvature in a cross-sectional view. Therefore, the case 2 can give a user an impression that the case 2 looks compact and thinner than an actual total thickness from an upper surface 3*a* to the bottom plate 4*b* when seen from the front, back, right, or left side in a placed state.

A contact portions 4*b*3 are provided on the bottom plate 4*b* of the lower case 4. The contact portions 4*b*3 touch a placing surface, such as a desk surface, when the keyboard instrument 1 is placed on a to-be-placed part, such as a desk, and are made of an elastic material, such as rubber.

Figure 3:
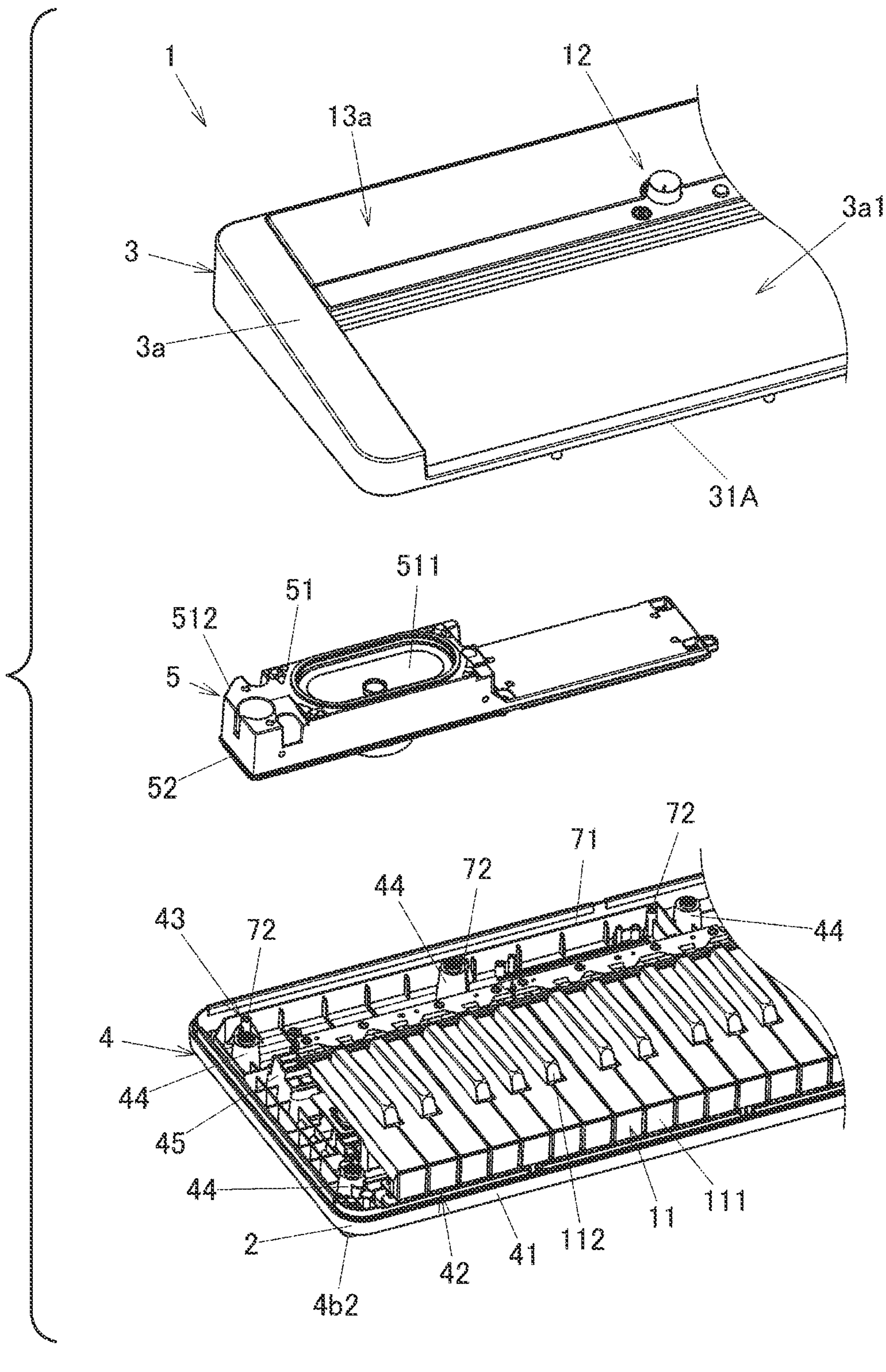
FIG. 3 is an exploded perspective view of a left side of the keyboard instrument according to the embodiment of the present disclosure.

FIG. 3 is an exploded perspective view of a left side of the keyboard instrument 1. The keyboard instrument 1 has an internal member 5 that is speaker units provided inside each of both sides in the right-left direction. Although the internal member 5, the case 2 (the upper case 3 and the lower case 4) configured to support the internal member 5, and the like on the right side of the keyboard instrument 1 are not shown, they are substantially symmetrical to those on the left side and a description thereof is omitted or simplified.

Figure 4:
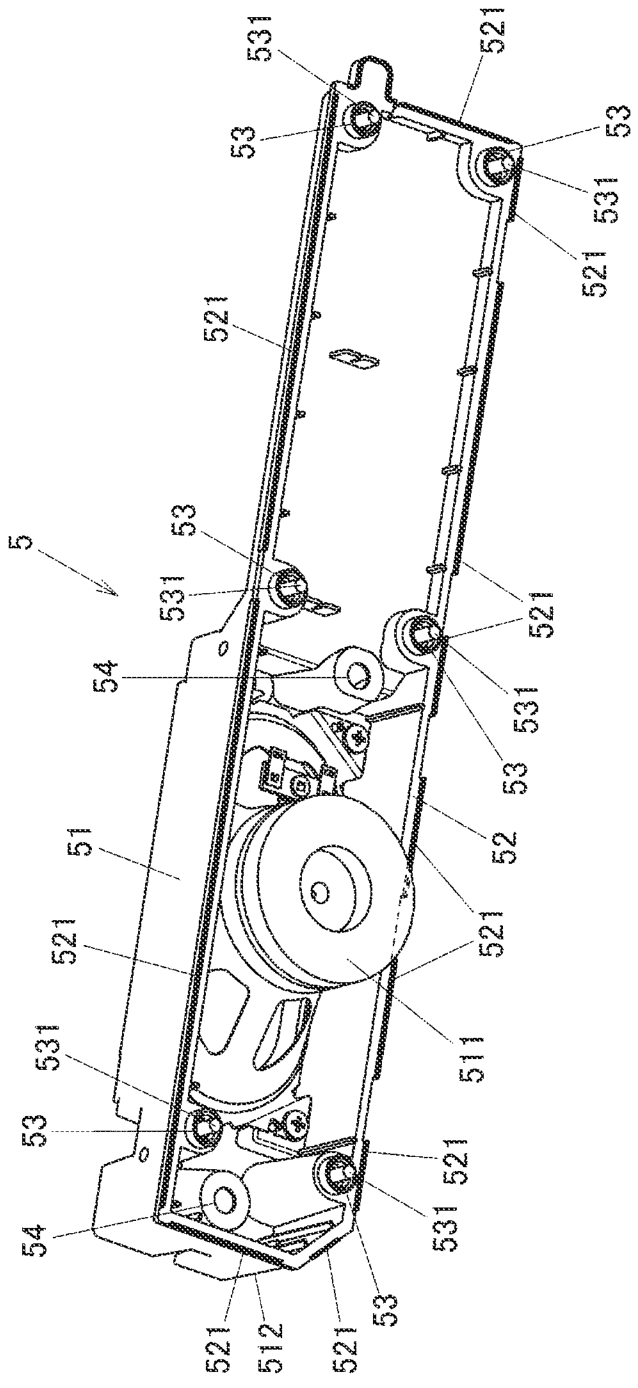
FIG. 4 is a perspective view of an internal member according to the embodiment of the present disclosure as seen from below.

The internal member 5 is formed in a rectangular shape whose longer direction is along the right-left direction as seen from above and has an inclined portion 512 inclined against a back surface and a left surface at a portion corresponding to a corner portion 23 on the left rear side of the case 2. The internal member 5 has a storage part 51 including a speaker 511 on an outer side (a left side in FIG. 3) of the keyboard instrument 1 in the right-left direction. In addition, as shown in FIG. 4, a contact part 52 is provided on an annular outer peripheral edge of a lower side of the internal member 5. The contact part 52 is provided in a flat surface shape. The contact part 52 is provided with positioning protrusions 521 protruding downward on an outer edge portion of the internal member 5. The positioning protrusions 521 are arranged on an outer peripheral surface of a support member 71 when the contact part 52 and the support member 71 are brought into contact with each other and the internal member 5 is arranged on an internal-member arranging part 43. Therefore, the internal member 5 is restricted from moving back and forth and right and left against the support member 71, so that the internal member 5 can be stably supported by the support member 71.

Figure 1C:
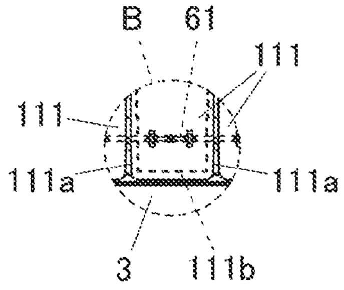
FIG. 1C is an enlarged view of a part B shown in FIG. 1A.
Figure 5A:
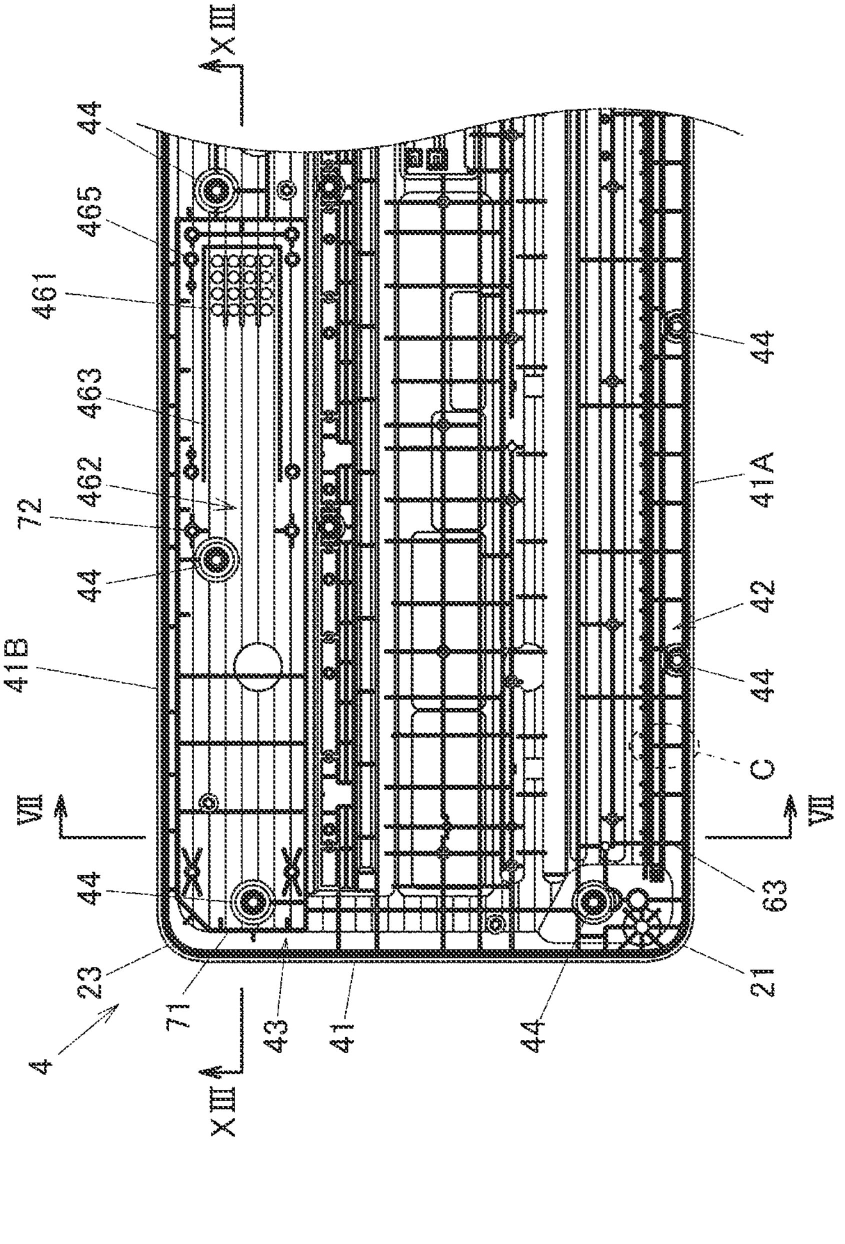
FIG. 5A is a plane view of an inner surface of a left side of a lower case according to the embodiment of the present disclosure.
Figure 5B:
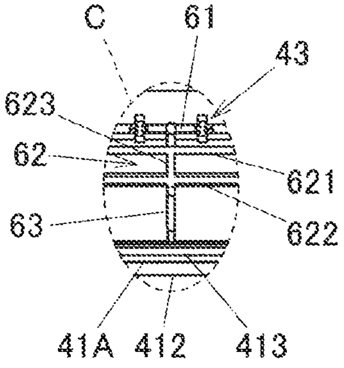
FIG. 5B is an enlarged view of a part C shown in FIG. 5A.

As shown in FIG. 5A, the lower case 4 has a key arranging part 42 on the front side and an internal-member arranging part 43 on the rear side. As shown in FIG. 5B, the key arranging part 42 has key guide portions 61 (also refer to FIG. 7) protruding upward from an inner surface of the lower case 4 in an aligning direction of the keys. Each white key 111 shown in FIG. 1A is arranged correspondingly to each key guide portion 61. In addition, as shown in FIG. 1C, since the key guide portion 61 is arranged in an internal space surrounded by a side plate 111*a* and a front plate 111*b*, the white key 111 can be stably moved up and down while being restricted from excessively swinging in the right-left direction.

In FIG. 5B, a to-be-attached part 62 to which a cushion member 624 (refer to FIG. 7) can be attached is formed by upper end surfaces of ribs 621 to 623, in front of the key guide portions 61. The to-be-attached part 62 is provided over the aligning direction (right-left direction) of the white keys 111 and the black keys 112. The to-be-attached part 62 has: horizontal ribs 621 and 622 that are provided parallel to the right-left direction in front of the key guide portions 61; and vertical ribs 623 that are provided vertically to the right-left direction and are arranged between the two horizontal ribs 621 and 622. The cushion member 624 is arranged such that substantially flush upper end surfaces of the horizontal ribs 621 and 622 and the vertical ribs 623 as an attaching surface. The vertical ribs 623 are provided in front of the key guide portions 61 correspondingly to each key guide portion 61 (that is, correspondingly to each white key 111).

Figure 6:
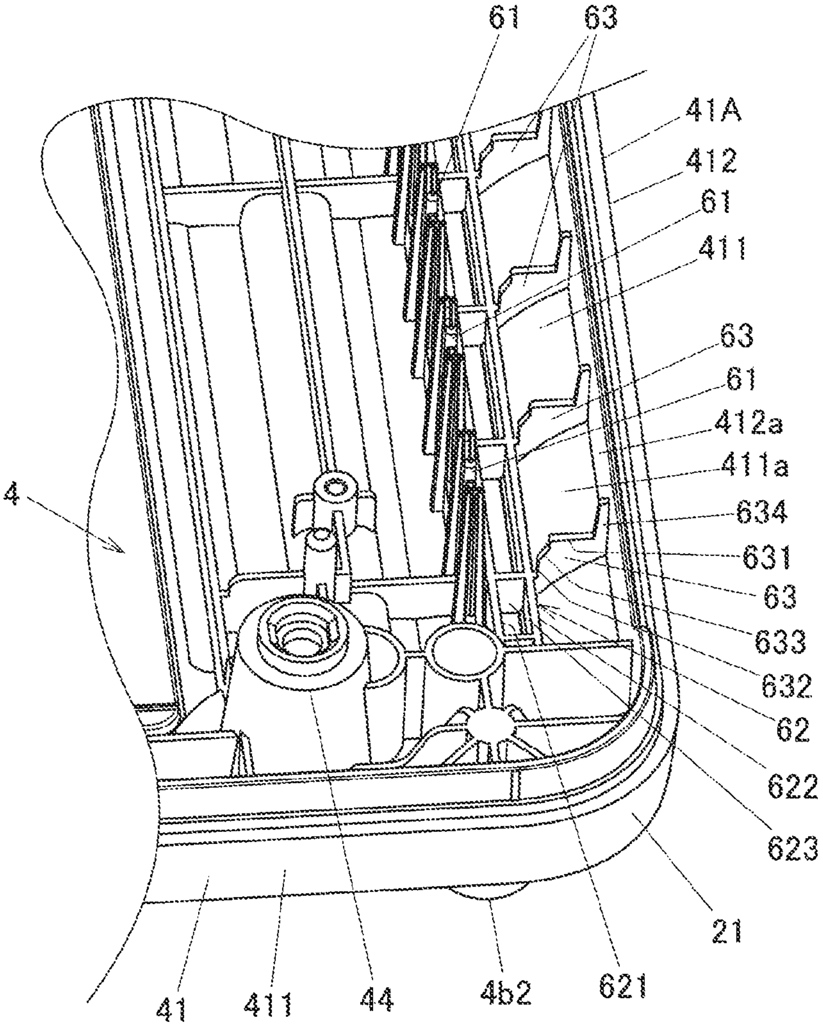
FIG. 6 is an enlarged perspective view around a front outer wall of the lower case according to the embodiment of the present disclosure.

As shown in FIGS. 5A and 6, the lower case 4 has inner ribs 63 at a position corresponding to an inner surface of a front outer wall 41A (second outer wall) on the opposite side to a rear outer wall 41B (first outer wall). Plate surfaces of the inner ribs 63 face toward the right-left direction. The inner ribs 63 extend over an inner surface 411*a* of the concave curved portion 411 and an inner surface 412*a* of a plate-shaped sidewall 412 provided continuously upward from the concave curved portion 411 of the front outer wall 41A (refer to FIG. 7). The inner ribs 63 are arranged in the right-left direction correspondingly to each white key 111 (each key guide portion 61). In addition, as shown in FIG. 5B, each inner rib 63 is continuously lined in front of the vertical ribs 623.

As shown in FIGS. 6 and 7, the inner ribs 63 are arranged along a thickness direction D2 (upper-lower direction) of the case 2 and are formed in an isosceles right triangular shape. An upper end edge 631 and a rear end edge 632 of the inner ribs 63 are substantially perpendicular to each other. The upper end edge 631 and the rear end edge 632 are separated by a J-shaped notch portion 633. The inner ribs 63 have upward extending portions 634 provided on the inner surface 412*a* of the sidewall 412. A longer direction of the upper extending portions 634 is along the upper-lower direction. A height of the upper extending portions 634 from the inner surface 412*a* is lower than a height from the inner surface 411*a* to the notch portion 633.

As shown in FIG. 2, the uppercase 3 and the lowercase 4 are fixed in the upper-lower direction by screw members 441 inserted in screw holes (not shown, in FIG. 2) provided in the bottom plate 4*b*. On the front side and the rear side of the upper case 3 and the lower case 4, the screw members 441 are inserted into the screw holes provided in boss-shaped case fixing portions 44 shown in FIG. 5A from below. The case fixing portions 44 are provided on the outer periphery of the case 2 as seen in a plane view direction.

As shown in FIG. 13, the upper case 3 and the lower case 4 are in contact with each other in the upper-lower direction at least at positions corresponding to the case fixing portions 44. On the other hand, as shown in FIG. 7, in the keyboard instrument 1 of the present embodiment, a lower end edge 313 of an outer wall 31A (31) of the upper case 3 and an upper end edge 413 of an outer wall 41A of the lower case 4 are spaced from each other with a gap S in a state where the upper case 3 and the lower case 4 are fixed.

When an external force pushing down the outer wall 31A of the uppercase 3 is applied, the outer wall 41A may be pushed down via the case fixing portions 44 near the outer wall 41A shown in FIG. 5A. In the present embodiment, since the inner ribs 63 are provided on the inner surfaces 411*a* and 412*a* of the front outer wall 41, it is possible to reduce bending deformation of the outer wall 41A of the lower case 4. Further, as shown in FIG. 5B, the vertical ribs 623 and the inner ribs 63 are arranged in lines. Therefore, even when the cushion member 624 (refer to FIG. 7) of the lower case 4 and a contact portion 111*c* of the white key 111 come into contact with each other due to keystroke of the white key 111 and the load is thus transmitted to the outer wall 41A via the vertical ribs 623, the bending deformation on the outer wall 41A of the lower case 4 can be reduced by resistance of the inner ribs 63. In this way, the inner rib 63 can improve strength of the outer wall 41A (and the outer wall 31A).

Figure 8:
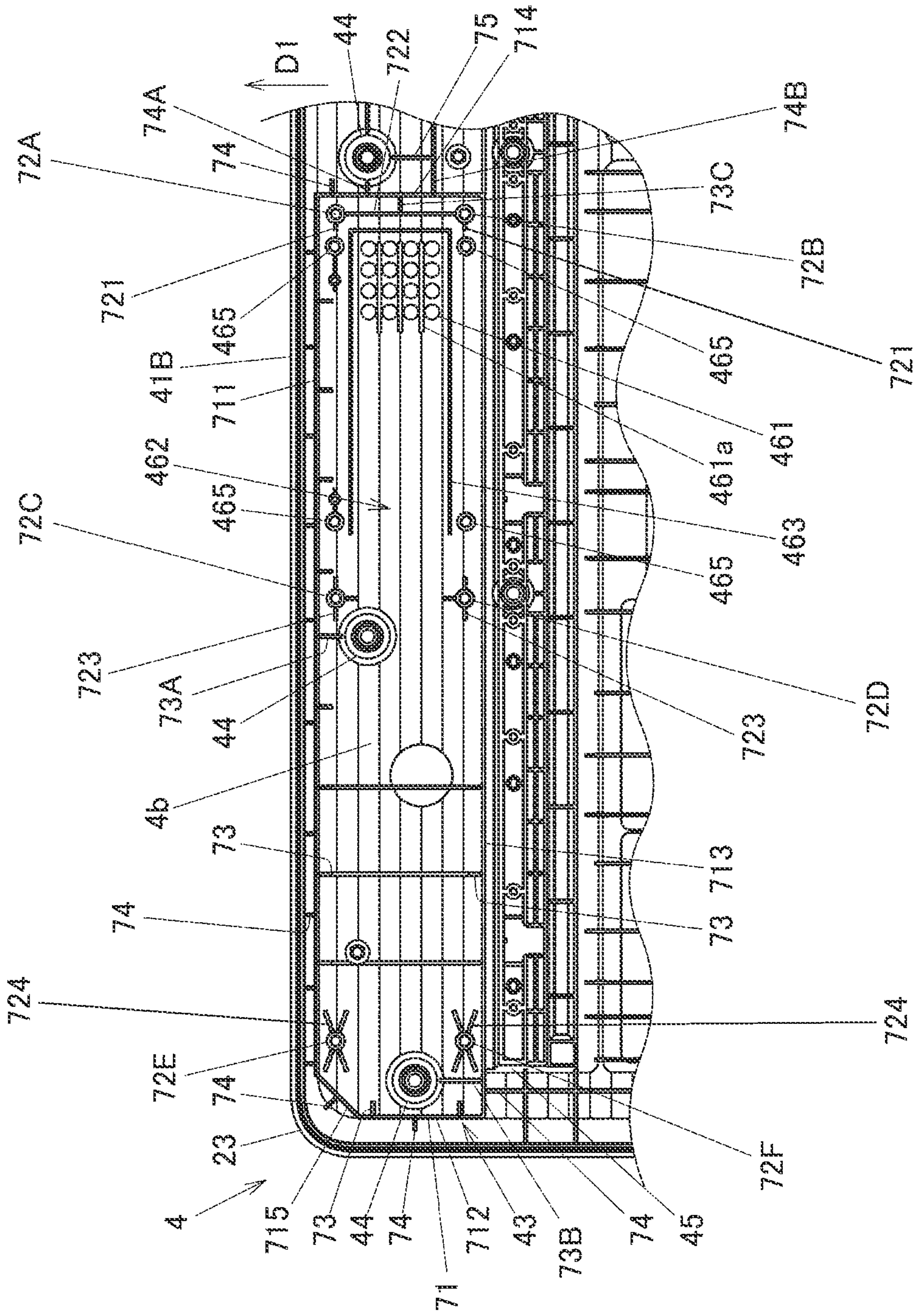
FIG. 8 is an enlarged plane view around an internal-member arranging part of the lower case according to the embodiment of the present disclosure.

As shown in FIG. 8, the internal-member arranging part 43 includes: a support member 71 in an annular shape (frame shape); and six fixing members 72 inside the support member 71. The support member 71 protrudes upward from the inner surface of the bottom plate 4*b* of the lower case 4 and is in an annular shape. An upper end of the support member 71 is substantially in the same plane. The support member 71 is along an outer peripheral shape of the internal member 5 in part as seen from above and flat plate parts 711 to 715 form a rectangular shape whose longer direction is along the right-left direction. The flat plate part 711 (a rib on the rear side in the front-rear direction of the key) and the flat plate part 712 (a rib on the left side in the aligning direction of the keys) are separated by the flat plate part 715. The flat plate part 715 is inclined at an approximately 45° angle against the flat plate part 711 and the flat plate part 714 (a rib on the right side in the aligning direction of the keys). The flat plate part 711 and the flat plate part 713 (a rib on the front side in the front-rear direction of the key) extend in the right-left direction. In addition, the flat plate part 712 and the flat plate part 714 extend in the front-rear direction.

Ribs are connected to the flat plate parts 711 to 715 of the support member 71 in a direction perpendicular to each plate surface. The flat plate part 711 near the rear outer wall 41B (first outer wall) is provided with inner ribs 73 and outer ribs 74 (inner ribs for the outer wall 41B). As shown in FIGS. 12 and 13, a longer direction of the inner ribs 73 and the outer ribs 74 is along a height direction (upper-lower direction) of the flat plate part 711. In addition, as shown in FIG. 8, the inner ribs 73 and the outer ribs 74 are staggered in the right-left direction (right-left direction for FIG. 8) of the keyboard instrument 1 so as not to line up on a straight line in the front-rear direction (upper-lower direction for FIG. 8) of the keyboard instrument 1. An inner rib 73A out of the inner ribs 73 is connected to one of the two case fixing portions in the support member 71 that is on the inner side (right side in FIG. 8) in the right-left direction of the keyboard instrument 1. The outer ribs 74 connected to the flat plate part 711 are all connected to the inner surfaces 411*a* and 412*a* of the rear outer wall 41B (also refer to FIG. 13). Therefore, the support member 71 is connected to the outer wall 41B by the outer ribs 74.

The flat plate part 712 is provided with two inner ribs 73 and an outer rib 74. The inner ribs 73 and the outer rib 74 connected to the flat plate part 712 are staggered in the front-rear direction (upper-lower direction for FIG. 8) of the keyboard instrument 1 so as not to line up on a straight line in the right-left direction (right-left direction for FIG. 8) of the keyboard instrument 1 as seen from above.

The flat plate part 713 in front of the flat plate part 711 is provided with inner ribs 73. An inner rib 73B out of the inner ribs 73 connected to the flat plate part 713 is connected to one of the two case fixing portions 44 in the support member 71 that is on the outer side (left side for FIG. 8) in the right-left direction of the keyboard instrument 1. Most of the outer surface of the flat plate part 713 is connected to a platform 45 in which an inner surface of the lower case 4 protrudes upward (toward the inner side of the lower case 4) (also refer to FIG. 12). The platform 45 extends over the entire right-left direction of the keyboard instrument 1 and can fix fixed ends of the white keys 111 and the black keys 112 (also refer to FIG. 1A). An outer rib 74 is also connected to the flat plate part 713 at a portion of the flat plate part 712-side. This outer rib 74 is arranged offset in the right-left direction (right-left direction for FIG. 8) of the keyboard instrument 1 so as not to line up with the inner rib 73A on a straight line in the front-rear direction (upper-lower direction for FIG. 8) of the keyboard instrument 1, as seen from above.

The flat plate part 714 on the inner side (right side in FIG. 8) of the flat plate part 712 in the right-left direction of the keyboard instrument 1 is provided with an inner rib 73 and three outer ribs 74. The inner rib 73 and the outer ribs 74 connected to the flat plate part 714 are staggered in the front-rear direction (upper-lower direction for FIG. 8) of the keyboard instrument 1 so as not to line up on a straight line in the right-left direction (right-left direction for FIG. 8) of the keyboard instrument 1 as seen from above. An outer rib 74A connected to the flat plate part 714 is directly connected to a side surface of the case fixing portion 44 provided outside the support member 71 (also refer to FIG. 9). In addition, another outer rib 74B is connected in a T shape to a support rib 75 provided in a forward direction from a side surface of the case fixing portion 44 so as to be substantially perpendicular to the support rib 75 and is separated from the case fixing portion 44 by the support rib 75.

In the present embodiment, as shown in FIGS. 5A and 8, inner ribs are arranged on the inner wall (inner surfaces 411*a* and 412*a*) of the exterior of the lower case 4 (case 2). Out of inner ribs (the inner ribs 63 and the outer ribs 74) arranged along the aligning direction of the keys, inner ribs 63 (front inner ribs) arranged on the front side in the front-rear direction of the keys are denser than inner ribs (outer ribs 74, rear inner ribs) arranged on the rear side.

Figure 9:
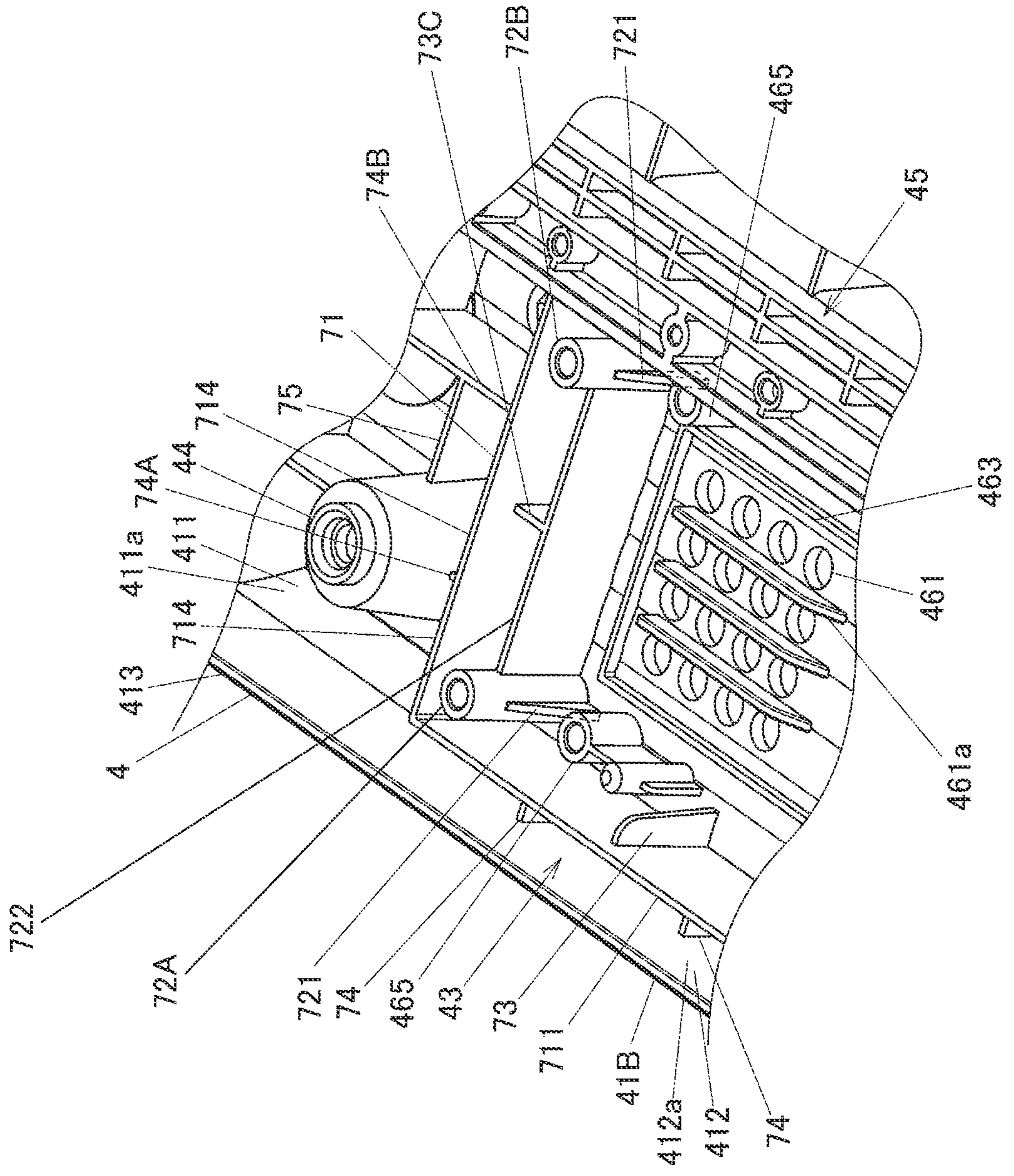
FIG. 9 is a perspective view around a fixing portion located near a center in a longer direction of the keyboard instrument according to the embodiment of the present disclosure.

The six fixing members 72 (fixing members 72A to 72F) inside the frame of the support member 71 are arranged in two rows and three columns in a plane view of FIG. 8. On the right side of FIG. 8, side surfaces of two fixing members 72A and 72B (third fixing member) near the flat plate part 714 and not between the speaker 511 and opening portions 461 are connected to ribs 721 and 722 (reinforcing member), respectively. The rib 722 connected to the fixing member 72A is arranged in a different direction substantially perpendicular to the ribs 721. As shown in FIG. 9, the ribs 721 are provided along the side surfaces of the fixing members 72A and 72B in a right-angled triangular shape. The fixing members 72A and 72B are connected by the rectangular-shaped rib 722. That is, the rib 722 functions as a reinforcement member and a connecting member. The rib 722 is arranged in parallel to the flat plate part 714 of the support member 71 and is lower than the flat plate part 714. The rib 722 and the flat plate part 714 are separated by an inner rib 73C located substantially at the center of the flat plate part 714 in the front-rear direction.

Figure 10:
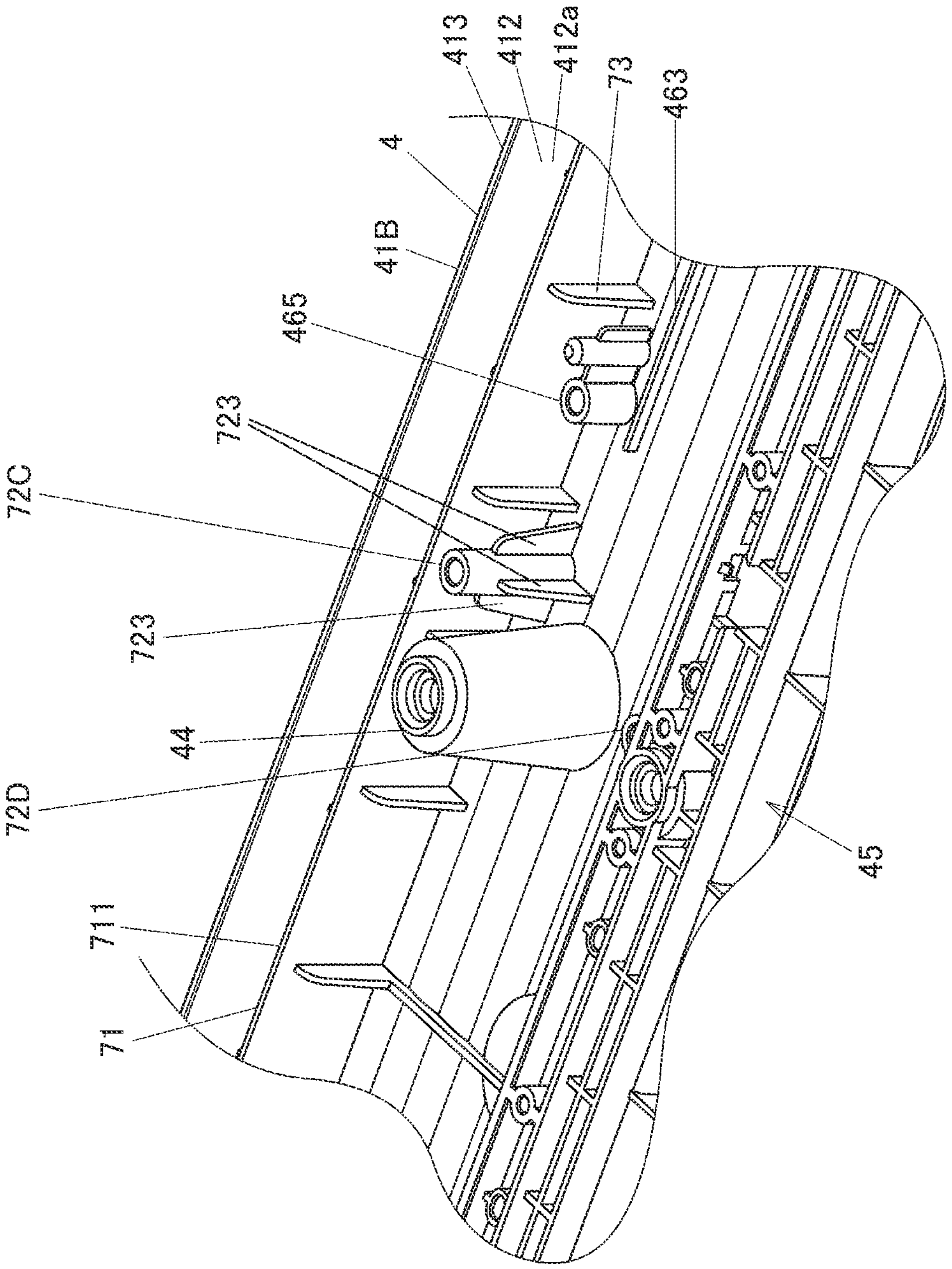
FIG. 10 is a perspective view around another fixing portion located on the left of the fixing portion shown in FIG. 9 of the keyboard instrument according to the embodiment of the present disclosure.

The fixing member 72 includes fixing members 72C and 72D (second fixing member) provided between the speaker 511 and the opening portions 461. Three ribs 723 are connected to side surfaces of the fixing member 72C located between the fixing members 72A and 72E and the fixing member 72D located between the fixing members 72B and 72F, respectively. As shown in FIG. 10, a longer direction of the rib 723 is along the upper-lower direction. The side surfaces of the fixing member 72C near the flat plate part 711 are connected to the ribs 723 on the right and left sides and the front side (side of fixing member 72D). The side surfaces of the fixing member 72D near the flat plate part 713 are connected to the ribs 723 on the right and left sides and the rear side (side of fixing member 72C) (refer to FIG. 8). That is, in FIG. 8, the ribs 723 provided on the fixing member 72D are symmetrical in the front-rear direction to the ribs 723 provided on the fixing member 72C in positions and shapes. A connecting member, such as the rib 722, is not provided between the fixing members 72C and 72D.

Figure 11:
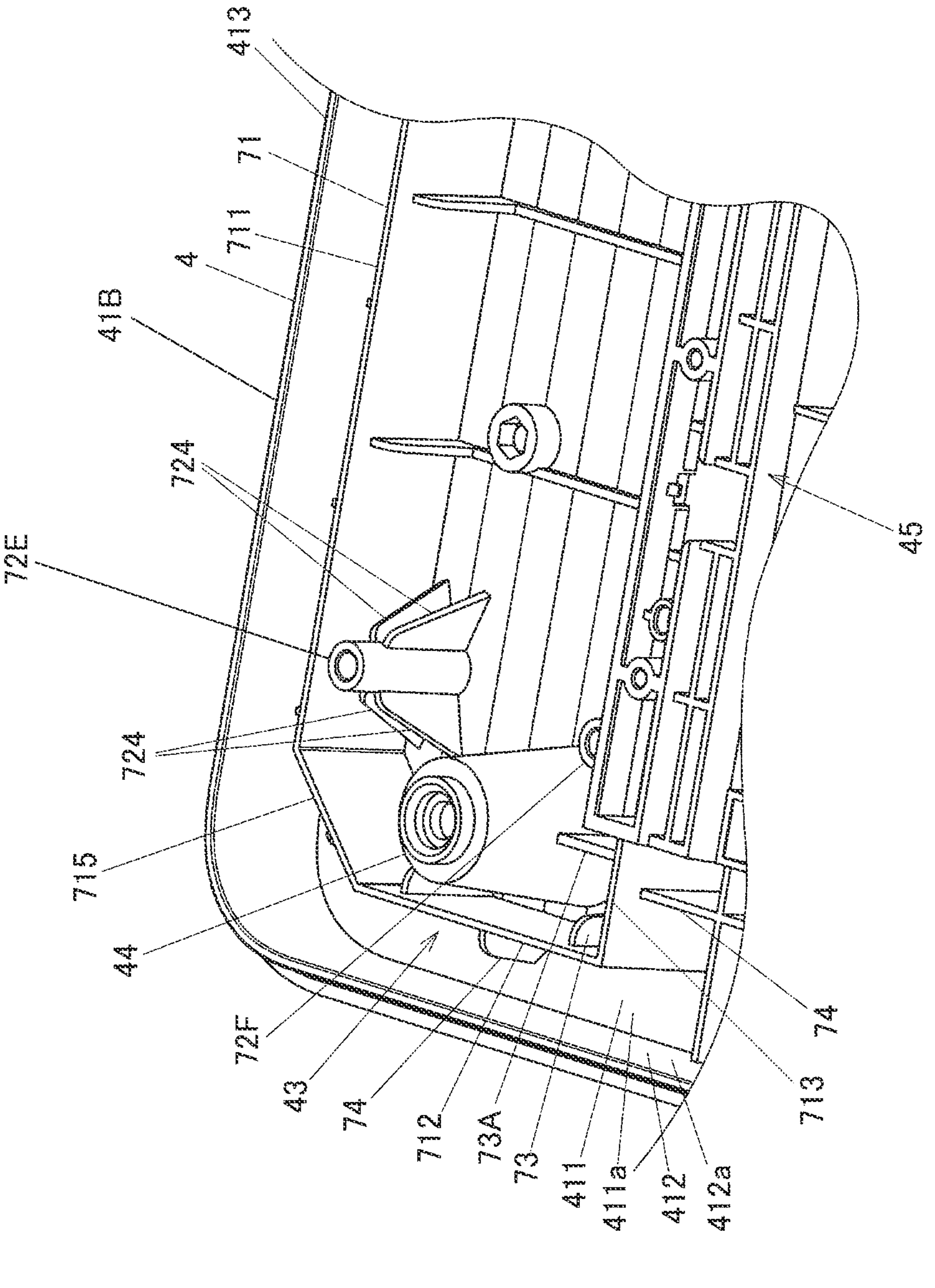
FIG. 11 is a perspective view around another fixing portion located on the left of the fixing portion shown in FIG. 10 of keyboard instrument according to the embodiment of the present disclosure.

The fixing member 72 includes fixing members 72E and 72F (first fixing member). (Four, in the present embodiment) ribs 724 (reinforcement member) are connected to side surfaces of each of the two fixing members 72E and 72F near the flat plate part 712 (left side in FIG. 8). The ribs 724 extends on diagonals (in other words, two lines intersecting at a center of the fixing member 72E or 72F) around each of the fixing members 72E and 72F. Each of the ribs 724 is longer than a distance between the fixing member 72E or 72F and the support member 71 near the fixing members 72E and 72F. Ribs 724 are formed in a right-angled triangular shape, as shown in FIG. 11. Further, as shown in FIG. 8, the four ribs 724 and the fixing members 72C to 72F are not connected to other ribs and the like (including the support member 71) provided on the inner surface of the lower case 4. As described above, the ribs 721 to 724, which are reinforcement members which is connected to the fixing member 72 and with which the fixing member 72 is reinforced, the support member 71, and the fixing member 72 are provided integrally with the case 2 (lower case 4). In addition, the ribs 721 to 724 are not connected to the support member 71. Since the rib 722 is separated by the inner rib 73C, the rib 722 is not at least directly connected to the support member 71.

Near the fixing members 72A and 72B inside the frame of the support member 71, the bottom plate 4*b* is provided with circular opening portions 461 penetrating the lower case 4. The opening portions 461 are configured to let a sound from the speaker 511 pass outside. On the inner surface of the lower case 4 is formed a duct wall part 463 that surrounds front and rear sides and a side of the flat plate part 714 of the opening portions 461 and has an opening part 462 on a side of flat plate part 712. The duct wall part 463 is lower than the ribs 721 and 722 (also refer to FIG. 9). In front and in the rear of the duct wall part 463 inside the support member 71, boss-shaped fixing portions 465 including a female screw portion for fixing a lid member 464 (refer to FIG. 13) are provided. When the lid member 464 is installed, the upper of the duct wall part 463 is covered, and a flow path L connecting the opening portions 461 and the opening part 462 is formed by a duct 46. By the flow path L, air can freely enter and exit between an acoustic space at the rear of the speaker 511 (a space provided inside the internal member 5 and the support member 71) and an external space to the keyboard instrument 1, thereby vibration of a diaphragm of the speaker 511 not hindered.

The internal member 5 is attached to the internal-member arranging part 43 with screw members 531 (refer to FIG. 4) inserted into the female screw portions of the fixing member 72 via the respective screw holes 53 with the contact part 52 and the support member 71 contacting. As shown in FIG. 12, an annular buffer member 71*a* is provided between the contact part 52 and the support member 71. Therefore, it is possible to prevent vibration noises due to contact between the contact part 52 and the support member 71 from being produced with the internal member 5 stably supported. Further, screw holes 54 provided in the internal member 5 are escapement portions through which the screw members 441 for fastening the upper case 3 and the lower case 4 are inserted.

In the keyboard instrument 1 of the present embodiment, since the internal member 5, which is a speaker unit, and the other internal members are disposed on the rear side in the case 2, the center of gravity of the entire keyboard instrument 1 is on the rear side. If the keyboard instrument 1 drops, the side surface of the outer wall 41B near the center of gravity of the keyboard instrument 1 may collide with a placing surface or the like. In the present embodiment, as shown in FIG. 8, the ribs 723 and 724 of each of the fixing members 72C to 72F for fixing the internal member 5 are separated from the support member 71 at least on a sider of the rear outer wall 41B (first outer wall). In addition, the ribs 722 of the fixing members 72A and 72B are connected to the outer wall 41B, which is near the ribs 722, via a direction different from a direction of the outer wall 41B (outer-wall direction D1)(via the inner rib 73C in FIG. 8). For this reason, an impact from the outside received by the outer wall 41B is transmitted to the support member 71 via the outer ribs 74 but is not directly transmitted to the fixing members 72A to 72F. Therefore, it is possible to reduce load on the fixing members 72A to 72F and to prevent the fixing members 72A to 72F from being damaged.

Although the internal member 5 is the speaker units in the present embodiment, others such as a circuit board, a control panel, and a power supply box may be the internal member 5.

In addition, although the support member 71 is in the annular shape in the present embodiment, the support member 71 may have a partially cutout shape (for example, a C-shape, a U-shape, an L-shape, and the like as seen from above). The support member 71 may be disposed apart at two or more places.

Further, although the keyboard instrument 1 is provided with the case 2 and the fixing member 72 for fixing the internal member 5 in the present embodiment, the present disclosure can be applied to any device, such as another electronic musical instrument. The case 2 may be divided in a direction different from the upper-lower direction unlike in the keyboard instrument 1, or the internal member may be accommodated in a case with a lid member.

As described above, in the embodiment of the present disclosure, described were a device and an electronic musical instrument including: a frame-shaped support member 71 configured to support an internal member 5; a fixing member 72 that is inside a frame of the support member 71 and is configured to fix the internal member 5; and the reinforcement member that is connected to the fixing member 72 and with which the fixing member 72 is reinforced. The reinforcement member is not connected to the support member 71.

Even when an impact is applied to the outer wall from the outside, it is possible to prevent the impact from being transmitted to the fixing members 72A to 72F. Therefore, it is possible to provide a device and an electronic musical instrument in which load on the fixing member 72 in the case 2 is reduced.

A configuration has been described in which the fixing member 72 includes a first fixing member (72E and 72F), the reinforcement member includes ribs 724 extending from the first fixing member (72E and 72F) to form diagonals around the first fixing member (72E and 72F), and each of the ribs 724 is longer than a distance between the first fixing member (72E and 72F) and the support member 71 that is near the first fixing member (72E and 72F). With this configuration, load on the fixing member (72E and 72F) can be reduced, and the first fixing member (72E and 72F) can be reinforced.

A configuration has been described in which the internal member 5 includes a speaker 511, and an acoustic space is provided inside the internal member 5 and the support member 71. With this configuration, a device that can favorably protect the acoustic space can be provided.

A configuration has been described in which an opening portion 461 configured to let a sound from the speaker 511 pass outside is provided in the frame of the support member 71, the fixing member 72 includes second fixing members (72C and 72D) provided between the speaker 511 and the opening portion 461, and the second fixing members (72C and 72D) are not connected by a connecting member. Since a flow path L between the opening portion 461 and the speaker 511 is not blocked by a connecting member, the sound from the speaker 511 can be favorably discharged to the outside and load on the fixing member (72C and 72D) can be reduced.

A configuration has been described in which the fixing member 72 includes third fixing members (72A and 72B) that are not between the speaker 511 and the opening portion 461, and the third fixing members (72A and 72B) are connected by a connecting member. With this configuration, the third fixing members (72A and 72B) can be favorably reinforced with the discharge of the sound from the speaker 511 to the outside not hindered.

By integrally providing the support member 71, the fixing member 72, and the reinforcement member with the case 2 (lower case 4), a configuration can be easily achieved in which the internal member 5 is fixed and load on the fixing member 72 is reduced.

A configuration has been described in which a keyboard 11 having keys (white keys 111 and black keys 112) is provided, and, out of inner ribs (the inner ribs 63 and the outer ribs 74) arranged on an inner wall of the exterior of a case 2 and along an aligning direction of the keys, those on a front side are denser than those on a rear side in a front-rear direction of the key. With this configuration, reinforcement on the rear side can be lighter and simpler than on the front side.

According to the present disclosure, it is possible to provide a device and an electronic musical instrument that can reduce load on a fixing portion in a case.

Although some embodiments of the present disclosure have been described, the embodiments are examples and are not intended to limit the scope of the disclosure. These novel embodiments can be other embodiments, and various omissions, replacements, and changes can be made without departing from the gist of the disclosure. The embodiments and variations thereof are included in the scope and gist of the disclosure and are included in the disclosure described in the claims and the equivalents thereof.

The invention claimed is:

1. An electronic musical instrument comprising:
- a case including an upper case and a lower case; and
- an internal member provided in the case, the internal member comprising a speaker,
- wherein the lower case comprises:
  - a frame-shaped support member, the support member being a separate member from the internal member and being configured to support the internal member;
  - a fixing member provided inside an outer periphery of the support member and being configured such that the internal member is fixable thereto in a state in which the internal member is received on the support member; and
  - a reinforcement member that is connected to the fixing member and with which the fixing member is reinforced, the reinforcement member not being connected to the support member.

2. The electronic musical instrument according to claim 1, wherein:
- the fixing member comprises a first fixing member,
- the reinforcement member comprises a plurality of ribs extending from the first fixing member to form diagonals around the first fixing member, and
- each of the plurality of ribs is longer than a distance between the first fixing member and the support member that is near the first fixing member.

3. The electronic musical instrument according to claim 1, wherein an acoustic space is defined inside the internal member and the support member.

4. The electronic musical instrument according to claim 2, wherein an acoustic space is defined inside the internal member and the support member.

5. The electronic musical instrument according to claim 3, further comprising an opening portion that is configured to let a sound from the speaker pass outside, and that is provided inside the frame,
- wherein:
- the fixing member comprises a plurality of second fixing members provided between the speaker and the opening portion, and
- the second fixing members are not connected by a connecting member.

6. The electronic musical instrument according to claim 4, further comprising an opening portion that is configured to let a sound from the speaker pass outside, and that is provided inside the frame,
- wherein:
- the fixing member comprises a plurality of second fixing members provided between the speaker and the opening portion, and
- the second fixing members are not connected by a connecting member.

7. The electronic musical instrument according to claim 5, wherein the fixing member comprises a plurality of third fixing members, the third fixing members not being located between the speaker and the opening portion, and the third fixing members being connected by the connecting member.

8. The electronic musical instrument according to claim 6, wherein the fixing member comprises a plurality of third fixing members, the third fixing members not being located between the speaker and the opening portion, and the third fixing members being connected by the connecting member.

9. The electronic musical instrument according to claim 1, wherein the support member, the fixing member, and the reinforcement member are provided integrally with the lower case.

10. The electronic musical instrument according to claim 1, further comprising a keyboard having a plurality of keys on a front side of the electronic musical instrument, wherein:

plural front inner ribs are arranged on an inner wall on a front side of an exterior of the case along an aligning direction of the keys, plural rear inner ribs are arranged on an inner wall on a rear side of the exterior of the case along the aligning direction of the keys, and an arrangement density of the front inner ribs is greater than an arrangement density of the rear inner ribs.

11. The electronic musical instrument according to claim 10, wherein:

the fixing member comprises a first fixing member, the reinforcement member comprises a plurality of ribs extending from the first fixing member to form diagonals around the first fixing member, and each of the plurality of ribs is longer than a distance between the first fixing member and the support member that is near the first fixing member.

12. The electronic musical instrument according to claim 10, wherein an acoustic space is defined inside the internal member and the support member.

13. The electronic musical instrument according to claim 12, further comprising an opening portion that is configured to let a sound from the speaker pass outside, and that is provided inside the frame, wherein:

the fixing member comprises a plurality of second fixing members provided between the speaker and the opening portion, and the second fixing members are not connected by a connecting member.

14. The electronic musical instrument according to claim 13, wherein the fixing member comprises a plurality of third fixing members, the third fixing members not being located between the speaker and the opening portion, and the third fixing members being connected by the connecting member.

15. The electronic musical instrument according to claim 10, wherein the support member, the fixing member, and the reinforcement member are provided integrally with the case.

* * * * *